United States Patent [19]

Branick

[11] 4,036,275
[45] July 19, 1977

[54] TIRE STRIPPING APPARATUS

[76] Inventor: Charles Earl Branick, 1601 S. 9th St., Fargo, N. Dak. 58102

[21] Appl. No.: 588,725

[22] Filed: June 20, 1975

Related U.S. Application Data

[63] Continuation of Ser. No. 460,356, April 12, 1974, abandoned.

[51] Int. Cl.² ............ B29H 21/08; B24B 21/02
[52] U.S. Cl. .................... 157/13; 51/145 R; 51/DIG. 33
[58] Field of Search ......... 157/13; 51/106 R, 145 R, 51/DIG. 33

[56] References Cited
U.S. PATENT DOCUMENTS

| | | | |
|---|---|---|---|
| 1,851,555 | 3/1932 | Wheeler | 157/13 |
| 2,243,461 | 5/1941 | Haskins | 157/13 |
| 2,258,378 | 10/1941 | Collmann | 157/13 |
| 2,524,489 | 10/1950 | Strong | 157/13 |
| 2,925,125 | 2/1960 | Curry | 157/13 |
| 3,095,674 | 7/1963 | Lee | 51/145 R X |
| 3,584,673 | 6/1971 | Lehmann | 157/13 |
| 3,681,877 | 8/1972 | Shively et al. | 157/13 X |
| 3,877,506 | 4/1975 | Mattox et al. | 157/13 |

*Primary Examiner*—Al Lawrence Smith
*Assistant Examiner*—James G. Smith
*Attorney, Agent, or Firm*—Fred Wiviott

[57] ABSTRACT

An apparatus for stripping tread from a tire in preparation for tire retreading operations includes a hollow, generally cylindrical cutter which is mounted for rotation with a sharpened cutting edge of the cutter disposed adjacent the surface of a rotating tire to be stripped and with the cylindrical cutter surface intersecting the tire surface at a relatively large angle. A pivotally and oscillatorly mounted abrading device is provided adjacent the cutter for roughening both the tread and shoulder portions of the stripped tire.

18 Claims, 6 Drawing Figures

TIRE STRIPPING APPARATUS

This is a continuation, of application Ser. No. 460,356, filed Apr. 12, 1974, and now abandoned.

BACKGROUND OF THE INVENTION

This invention relates generally to the art of tire retreading, and in particular to an apparatus for stripping excess rubber from a worn tire before new tread is applied to the tire carcass. In the retreading of tires, the unworn tread material is removed to provide a suitable surface for receiving a strip of new tread material. One common prior art tread removal apparatus consisted of a rapidly rotating rasp wheel which tended to generate copious amounts of fine rubber particles which constituted an operator health hazard.

SUMMARY OF THE INVENTION

It is a primary object of the present invention to provide a new and improved tire stripping apparatus.

Another object of the invention is to provide a tire stripping apparatus which strips tread rubber from tires while minimizing the generation of fine rubber particles.

A further object of the present invention is to provide an apparatus for removing tread rubber from old tires which facilitates collection of the stripped rubber.

A still further object of the present invention is to provide a tire stripping apparatus for producing the required retreading surface characteristics on the tire after it has been stripped.

How these and other objects of the present invention are accomplished will be more fully understood after reading the following detailed description of a preferred embodiment of the invention taken in conjunction with the drawings. In general terms, the apparatus of the present invention comprises a means for supporting the tire to be stripped and for rotating the same about a generally horizontal axis. A hollow, generally cylindrical cutting member is suitably mounted for rotation about its longitudinal axis and has a sharpened cutting edge disposed adjacent the tire and with its cylindrical surface intersecting the tire surface at an obtuse angle. Means are also provided for gradually bringing the tread portion of the tire into proximity with the cutting edge of the revolving cylindrical cutting member and for rotating and oscillating the tire relative to the cutter so that the desired amount of old rubber may be removed from the shoulder and tread portions of the tire. In a preferred embodiment of the invention a roughing means such as a belt sander is mounted above the tire to roughen the surface on the stripped tire to insure adherence between it and the subsequently applied retreading material.

DESCRIPTION OF A PREFERRED EMBODIMENT

Figure 1:
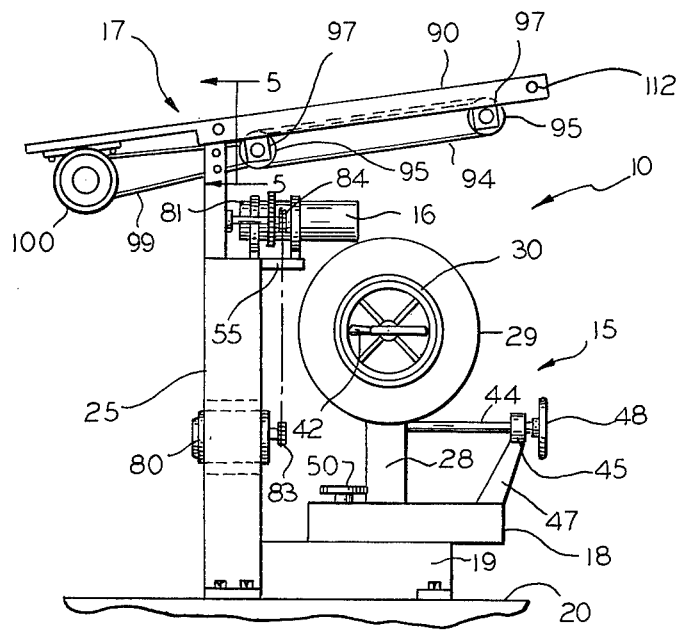
FIG. 1 is a perspective view of a tire stripping apparatus according to the preferred embodiment of the present invention.

FIG. 1 depicts a tire stripping apparatus 10 according to a preferred embodiment of the present invention to include a tire support assembly 15, a cutting assembly 16 and a roughing assembly 17. Tire support assembly 15 is pivotally mounted to a base 18 in a manner which will be discussed in greater detail below. Base 18 is in turn slidably mounted on a stand 19 suitably secured to a support floor 20. Cutting assembly 16 and roughing assembly 17 are supported on a jack post 25 which may also be suitably affixed to the stand 19.

The support post 28 is pivotally mounted to the side of base 27 by means of a horizontal pivot shaft (not shown) to allow support post 28 to be tilted in a generally vertical plane to permit the adjustment of the position of rim 30 relative to cutting assembly 16. Adjustment of support post 28 is accomplished by means of a screw shaft 44 which is rotatably coupled at one end to the post 28 and which extends through a nut 45 mounted atop a second post 47 affixed to base 27. A hand wheel 48 is affixed to shaft 44 for finely adjusting the position of rim 30 as desired.

The base 27 may also be slidably mounted on the stand 20 and which may be clamped in various positions relative to cutting assembly 15 by a suitable clamp, not shown, but which is symbolized by a hand wheel 50. This permits gross adjustments between rim 30 and cutting assembly 15 to accommodate different tire sizes.

In general, the tire mounting assembly 15 includes the support base 18 from which a generally vertical support post 28 extends. The tire 29 to be stripped is mounted adjacent the upper end of post 28 by means of a wheel rim 30 and a shaft 31 while a drive motor assembly 32 is mounted adjacent the lower end of post 28. The wheel rim 30 may be of any well-known type which permits the rapid mounting, demounting and inflation of the tire 29. The shaft 31 is mounted by means of a suitable bearing 34 adjacent the upper end of post 31 for rotation about a generally horizontal axis. The motor drive assembly 32 includes a motor 36 having a sprocket 37 affixed to its output shaft. A chain 38 interconnects the sprocket 37 with a second sprocket 40 mounted on shaft 31 for rotating the latter and rim 30 and tire 27 when motor 36 is energized.

The wheel rim 30 is coupled to the shaft 31 by means of a universal joint (not shown) at a point approximating the center of the rim 31 to permit the wheel to be oscillated approximately 120° relative to the cutting assembly 20 so that the excess material may be removed from the entire face of the tire as well as the shoulder portions along each side. A handle 42 is coupled to wheel rim 30 through a slip coupling to permit the operator to oscillate the wheel rim 30 while the latter is rotating.

The support assembly 15 provides the necessary manipulative capabilities to allow tire 29 to be first located in the adjacent and then slowly moved toward cutting assembly 16, and to be oscillated through a sufficiently large angle that shoulder and tread areas of the tire can contact cutting assembly 16. Tire support assembly 15 has been described only in general terms for purposes of brevity because the system, as such, in known to the art. For purposes of the present invention, it is only necessary that a tire support system be employed which possesses the aforementioned manipulative capabilities for a tire mounted thereon, and any other system known to the art can be employed with the elements of the present invention which will now be described. It will also be appreciated that while in the preferred embodiment the tire 29 is shown to be movable relative to the cutting assembly 16, the wheel 30 could be mounted for rotation about a fixed axis and the assembly 16 be made movable relative thereto.

Figure 2:
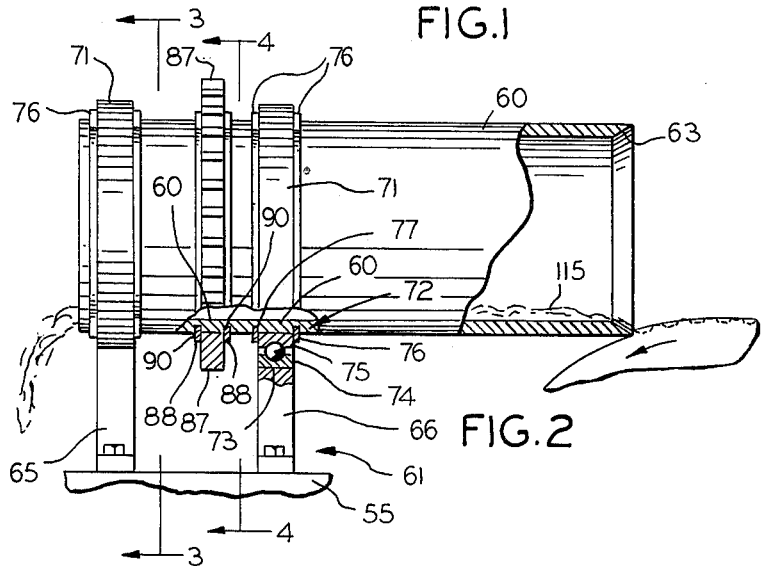
FIG. 2 is a side elevational view of the cylindrical cutter shown in FIG. 1, with parts broken away.
Figure 5:
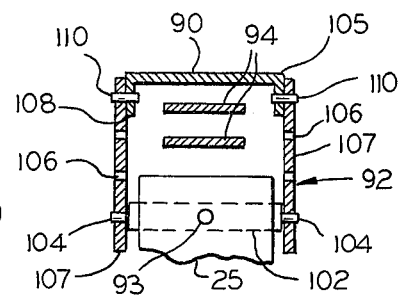
FIG. 5 is view taken along the line 5—5 of FIG. 1.

Cutting assembly 16 is supported on a platform 55 integrally formed at the upper end or jack post 25 so that said assembly is situated for engaging the periphery of tire 29 so that as the latter rotates, its uncut portion moves toward cutting assembly 16. As seen more particularly in FIGS. 2, 3 and 4, the assembly 16 includes a cutting tool 60, a bearing support 61 and a drive assembly 62. The cutting tool 60 comprises a hollow, tubular member formed of any suitable tool steel which in a preferred form may be approximately 5 to 10 inches long and between 3 and 4 inches in diameter with a wall thickness of about 3/16 of an inch. One end of the inside surface of tool 60 may be ground at an angle to form a cutting edge 63 which intersects the outside surface of said tool. It will be appreciated, however, that either or both of the surfaces may be ground to form cutting edge 63. Also, although FIG. 2 shows the cutting surface to be smooth around the bore of tool 60, the cutting edge 63 also may be serrated.

Figure 3:
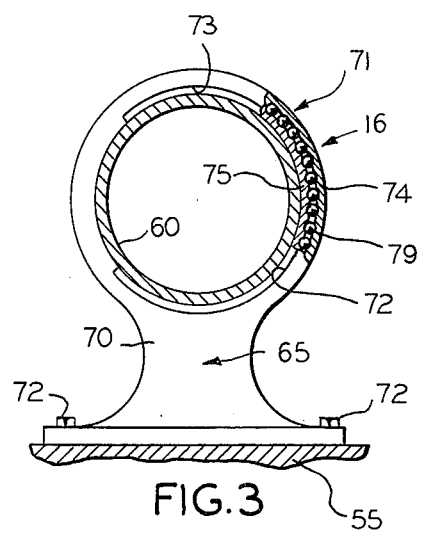
FIG. 3 is a view taken along the line 3—3 of FIG. 2.
Figure 4:
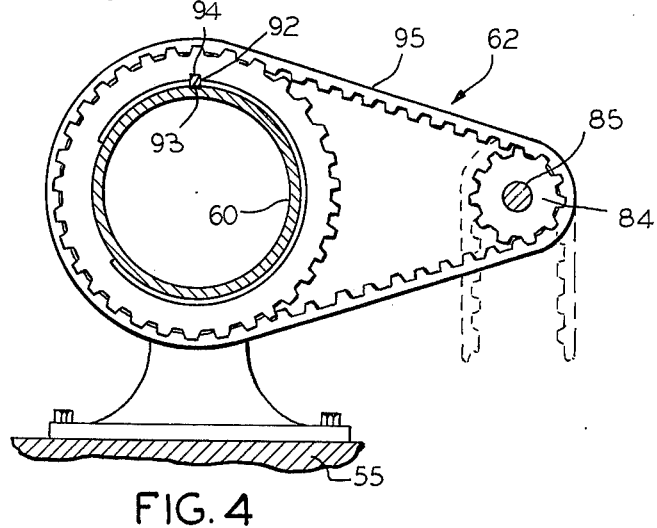
FIG. 4 is a view taken along the line 4—4 of FIG. 2.
Figure 6:
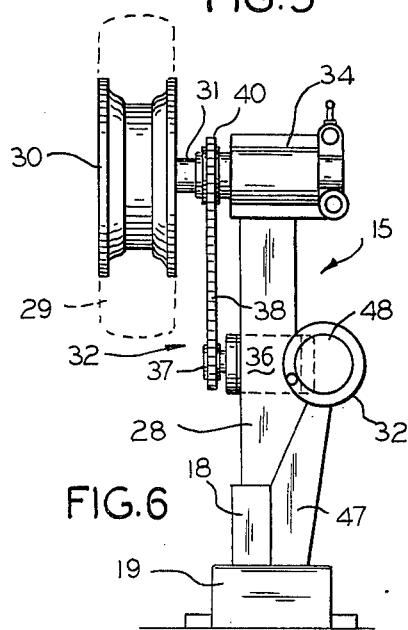
FIG. 6 is an end view of the tire mounting assembly shown in FIG. 1.

Tool 60 is supported on platform 55 by a pair of bearing supports 65 and 66 which are identical and accordingly, only bearing support 65 will be discussed in detail. As seen in FIGS. 2 and 3, bearing support 65 includes a generally vertically oriented support member 70 and a bearing assembly 71. Those skilled in the art will appreciate that the bearing assembly 71 may comprise any suitable bearing, although for purposes of illustration a ball bearing assembly is illustrated. Support member 70 is affixed at its lower end to platform 55 in any suitable manner such as by bolts 72. The upper end of support member 70 is generally annular and has a circular aperture 73 formed therein for receiving the bearing assembly 71 and the tool 60 therethrough.

The ball bearing assembly 72 includes an outer race 74 which is suitably affixed to the surface of aperture 73 and an inner race 75 which is affixed to the outer surface of tool 70 in any suitable manner such as by a pair of snap rings 76 which are each received in one of a pair of spaced apart grooves 77 formed in the outer surface of tool 60. A plurality of ball bearings 79 are disposed between the races 74 and 76. Preferably, the ball bearing assembly 72 of the bearing supports 65 and 66 provide both radial and thrust loading capacity. The tool 60 is preferably mounted such that its cutting edge 63 intersects the surface of the tire 29 at a relatively large obtuse angle so that a relatively sharp, clean cut may be made.

The tool 60 may be rotated about its longitudinal axis in any suitable manner such as by a drive motor 80 and a chain and sprocket assembly 81. Motor 80 is mounted in any suitable manner on the jack post 25 and has a first sprocket 83 affixed to its output shaft. A second sprocket 84 is mounted on a shaft 85 which is suitably journaled on jack post 25 for rotation about an axis which is generally parallel to tool 60. A third sprocket 87 is disposed in surrounding relation to tool 60 intermediate the bearing supports 65 and 66 and is held in position by a pair of snap rings 88 which engage the sides of sprocket 87 and are received in suitable annular grooves 90 formed in tool 60. A driving connection between sprocket 87 and tool 60 is suitably provided such as by means of a key 92 which is received in suitable axially extending keyway slots 93 and 94 which are respectively formed in tool 60 and sprocket 87. A first roller chain 94 interconnects sprockets 83 and 84 and a second roller chain 95 interconnects sprockets 84 and 87. Motor 80 may preferably be of the variable speed type so that the rotational speed of the tool 60 may be controlled. Preferably, the tool 60 will be rotated at a speed of approximately 30 – 60 revolutions per minute.

The roughing assembly 17 is mounted at the upper end of jack post 25 and generally includes a frame 90 which extends above and in general parallelism with the wheel rim 30. Frame 90 is mounted intermediate its ends for pivotal movement about a generally transverse axis at the upper end of a rocker bracket 92 which in turn is pivotally mounted by means of a pin 93 to the upper end of jack post 25. Pin 93 extends generally parallel to frame 90 to permit the arcuate rocking of the roughing assembly 17 about the tire 29 as will be described more fully below.

The roughing assembly also includes an abrasive endless belt 94 which extends over a pair of rollers 95 and 97 journaled for rotation about a transverse axis on spaced apart brackets 97 which extend downwardly from the frame 90. Roller 95 has a pulley (not shown) affixed to one end and which is connected by a belt 99 to the output shaft of a drive motor 100 whereby the belt 94 will be driven when motor 100 is energized.

The rocker bracket 92 includes a first generally U-shaped bracket member 102 whose center portion is pivotally connected by pin 93 to the jack post 25 for rocking movement about an axis which is generally parallel to frame member 90. The opposite end portions of bracket 102 are each connected by pins 104 into one of a series of openings 106 formed in longitudinally spaced apart relation in vertically extending support arms 107. The frame member 90 is pivotally coupled to the upper ends of arms 107 by means of downwardly extending brackets 108 and pins 110. A pair of handles 112 extend transversely from the end of frame 90 disposed generally above the tire 29. It will be appreciated that the operator can manipulate the abrasive belt 90 downwardly toward the tire 29 and in addition, move the belt 94 in a generally arcuate path across the surface of tire 29 to abrade the entire surface to be recapped in addition to the side shoulders.

In operation of the assembly, the tire 29 to be stripped is initially mounted on the wheel rim 30 and base 18 is positioned and clamped such that tire 29 is adjacent the cutting assembly 16. The motor 32 is then energized for rotating the tire 32 relatively slowly and generally in a counterclockwise direction as viewed in FIG. 1. The motor 80 is simultaneously energized for rotating the tool 60. The hand wheel 48 is then rotated moving the tire 29 toward the tool 60 for the removal of excess tread material. After one or more revolutions of the tire 29, the latter may be oscillated by means of handle 42 so that adjacent annular portions of the tire may be similarly stripped. Fine adjustment of the position of tire 29 relative to tool 66 is made by hand wheel 48 as various portions of the tire are stripped. As seen in FIG. 2, the rubber 115 which is removed from the tire 30 passes longitudinally down the tool 60 and discharges from the remote end for collection in a suitable container (not shown). For this purpose it may be desirable to tilt the tool 60 slightly so that the cutting edge 63 is elevated relative to the opposite discharge end. After the desired quantity of rubber has been removed from tire 29, motor 80 will be de-energized and motor 100 energized.

The support beam 90 for roughing assembly 17 is then pivoted downwardly to bring the abrasive belt into contact with the tire surface for slightly roughening the same to provide better adhesion for the strip of tread material which will thereafter be affixed to the stripped surface of the tire carcass 29.

Although only the single embodiment of the invention has been shown and described, it is not intended to be limited thereby but only by the scope of the appended claims.

It will be appreciated that as the cutting edge 63 of tool 60 becomes dull, it may be resharpened repeatedly until the length thereof becomes too short for proper mounting whereupon it may be replaced.

I claim:

1. An apparatus for stripping tread from tires comprising,
   tire support means including means for rotating a tire about its normal axis of rotation including wheel means for supporting said tire,
   generally tubular cutting means having a cutting edge at one end thereof and mounted for rotation adjacent the tread portion of a tire mounted on said tire support means,
   first means for displacing said wheel means into and out of engagement with said cutting means,
   means for oscillating said wheel means whereby shoulder and tread portions of a tire may be engaged with said cutting means,
   tire abrading means and second support means disposed adjacent said tire support means and supporting said tire abrading means, said tire abrading means includes an elongate support pivotally mounted on said second support means adjacent said tire support means, abrasive belt means mounted on said elongate support means for pivotal movement therewith into selective tangential engagement with a tire supported on said tire support means, means also mounting said elongate support on said second support means for movement in an arcuate path which is generally normal to the axis of said elongate support whereby the shoulder portions of said tire may be abraded.

2. The apparatus set forth in claim 1 further including drive means for rotating said generally tubular cutting means about its longitudinal axis.

3. The apparatus set forth in claim 2 and including bearing means for supporting said generally tubular cutting means for rotation.

4. The apparatus set forth in claim 3 wherein said cutting means has generally cylindrical inside and outside surfaces, the end of at least one of said surfaces being sharpened to form a generally annular cutting edge.

5. The apparatus set forth in claim 4 wherein said cutting means is disposed with its longitudinal axis substantially horizontal and laying in a plane generally normal to the rotational axis of said tire means.

6. The apparatus set forth in claim 5 wherein said cutting edge intersects the surface of the tire at an obtuse angle.

7. The apparatus set forth in claim 6 wherein said one end of said surface is serrated.

8. The apparatus set forth in claim 6 wherein said drive means for rotating said cutting means comprises motor means and drive chain and sprocket means interconnecting said motor means and said cutting means.

9. The apparatus set forth in claim 6 wherein said bearing means comprises spaced apart bearings, said sprocket means engaging said cutting means intermediate said bearings.

10. The apparatus set forth in claim 9 wherein the longitudinal axis of said cutting means is inclined upwardly at a relatively small angle so that the end thereof having said cutting edge is elevated relative to its opposite end.

11. In combination, an apparatus for stripping tread from tires comprising,
    tire support means including drive means for rotating a tire mounted thereon about its normal axis of rotation,
    cutting means for engaging a tire mounted on said tire support means for removing excess material from said tire,
    tire abrading means, second support means disposed adjacent said tire support means and supporting said tire abrading means for movement into engagement with said tire, said tire abrading means includes an elongate support, coupling means for pivotally mounting said elongate support on said second support means adjacent said tire support means, belt sanding means mounted on said support means for pivotal movement therewith into selective tangential engagement with a tire supported on said tire support means, said coupling means also mounting said elongate support on said second support means for movement in an arcuate path which is generally normal to the axis of said elongate support whereby the shoulder portions of said tire may be abraded.

12. The invention set forth in claim 11 wherein said coupling means is pivotally mounted on said second support means for pivotal movement about a generally horizontal axis which lies in a generally normal to the rotational axis of said tire, said elongate support being pivotally mounted on said coupling means for pivotal movement about an axis generally normal to said plane.

13. An apparatus for stripping tires comprising,
    tire support means including means for rotating a tire about its normal axis of rotation,
    second support means disposed adjacent said tire support means, an elongate support means, pivot means for for mounting said elongate support means on said second support means and being constructed and arranged for pivotal movement about a first generally horizontal axis generally parallel to the pivotal axis of said tire, abrading means mounted on said elongate support means for pivotal movement therewith into selective tangential engagement with a tire supported on said tire support means,
    said pivot means also pivotally connecting said elongate support means and said second support means for pivotal movement of said elongate support means about a second generally horizontal axis lying in a plane generally normal to the rotational axis of said tire and spaced from the longitudinal axis of said elongate support means for supporting said elongate support on said second support means for movement in an arcuate path which is generally normal to the rotational axis of said tire so that said abrading means may be moved in an arcuate path around a peripheral portion of said tire whereby the shoulder portions of said tire may be abraded.

14. The apparatus set forth in claim 13 wherein said elongate support means extends outwardly from said second support means and generally above said tire support means, said abrading means being mounted below said elongate support means whereby pivotal movement of said elongate support means about said first axis will move said abrasive means downwardly into engagement with said tire.

15. The invention set forth in claim 14 wherein said abrading means includes elongate flexible belt means, spaced apart roller means mounted on said elongate support means to support said belt means, means for driving said belt means on said roller means for movement in a direction generally normal to the rotational axis of said tire, the span of said belt means between said rollers being unsupported to permit said belt to at least partially conform to the contour of said tire.

16. The invention set forth in claim 15 wherein said second support means is mounted laterally of the rotational axis of said tire, said elongate support means extending from said second support means above said tire, said belt means being mounted beneath said elongate support means for movement into engagement with said tire as said elongate support means is pivoted downwardly.

17. An apparatus for stripping tires comprising,
tire stripping means including means for rotating a tire about its normal axis of rotation,
second support means disposed adjacent said tire support means,
an elongate support, pivot means for mounting said elongate support on said second support means for pivotal movement about a first pivot axis generally parallel to the rotational axis of said tire,
first and second spaced apart roller means mounted on said elongate support means and rotatable about axes generally parallel to each other and to said first generally horizontal axis,
elongate abrasive endless belt means mounted on and extending over said first and second roller means for pivotal movement with said elongate support means and into selective abrading engagement with a tire supported on said tire support means,
said pivot means also being constructed and arranged for pivotal movement on said second support means about a second pivot axis below said elongate support means and lying in a plane generally normal to said first pivot axis for movement of said elongate support means in an arcuate path lying in a generally vertical plane so that said belt is movable into abrading engagement with the shoulder portions of said tire,
said drive means for driving said belt means in the direction generally normal to the rotational axis of said tire.

18. The invention set forth in claim 17 wherein said second support means is generally vertical, said elongate support means being mounted adjacent the upper end of said second support means and extending over said tire support means and in a direction generally normal to a vertical plane containing the rotational axis of said tire, said belt and roller means being mounted below said elongate support means.

* * * * *

UNITED STATES PATENT OFFICE
CERTIFICATE OF CORRECTION

Patent No. 4,036,275           Dated July 19, 1977

Inventor(s) Charles Earl Branick

It is certified that error appears in the above-identified patent and that said Letters Patent are hereby corrected as shown below:

Column 6, Claim 12, line 37, before "generally" insert
--plane--.

Column 8, Claim 17, line 21, cancel "said" before "drive" and insert --and--.

Signed and Sealed this

First Day of November 1977

[SEAL]

Attest:

RUTH C. MASON
Attesting Officer

LUTRELLE F. PARKER
Acting Commissioner of Patents and Trademarks